March 17, 1970  L. R. KELLEY  3,500,850
FLUID SIGNAL VIBRATING REED APPARATUS
Filed Sept. 15, 1967

Lonny R. Kelley
INVENTOR.

BY
ATTORNEY

United States Patent Office 3,500,850
Patented Mar. 17, 1970

3,500,850
FLUID SIGNAL VIBRATING REED APPARATUS
Lonny R. Kelley, Ballston Lake, N.Y., assignor to the United States of America
Filed Sept. 15, 1967, Ser. No. 668,754
Int. Cl. F15c 1/08, 1/12, 1/14
U.S. Cl. 137—81.5                           6 Claims

ABSTRACT OF THE DISCLOSURE

This invention relates to improved apparatus of the vibrating reed type in which a hollow vibrating reed is provided and positioned in cooperative relation to a fluid receiver to control the passage and interruption of a fluid flow from a fluid flow source to a fluid amplifier to thereby control the differential pressure output of the fluid amplifier in relation to the state of excitement of the vibrating reed.

BACKGROUND OF THE INVENTION

It is known to be useful in fluid operating sensing circuits to regulate a selected condition or control system variable by sensing a deviation of the variable from a desired value thereof and, through fluid operated control circuits including a fluid amplifier, to develop a fluid differential pressure from the fluid amplifier indicating adherence or lack of adherence to the desired value of variable.

In such systems, a resonant reed selected in frequency for a desired value is connected to a sensing system arranged to monitor the variable and to drive the resonant reed. The resonant reed according to the prior art is of solid construction with a free end positioned in a path of fluid flow and shaped to act as a means for interrupting fluid flow under conditions of reed resonance or lack of reed resonance, dependent upon the type of reed tip employed.

SUMMARY OF THE INVENTION

The subject invention is directed to an arrangement avoiding the necessity of interrupting fluid flow by providing a hollow reed with a central passage and a receiver in selected spaced arrangement to directionally control the passage of fluid to a fluid amplifier without introducing variables which can result from the application of fluid flow interrupting means. In one arrangement incorporating the subject invention a hollow reed is located in aligned spaced relation to a receiver to pass all of the fluid flow when the reed is stationary, and to pass a portion thereof dependent upon condition of resonance. In a variation of the subject invention the reed is selectively off-set from an aligned condition to selectively vary the fluid flow at resonant frequency.

In general, it is an object of this invention to provide an improved means and method of obtaining a fluid signal from a vibrating reed to simplify the system, reduce costs and improve reliability.

Other objects and advantages will appear from the following description of an example of the invention when considered in connection with the accompanying drawings, and the novel features will be particularly pointed out in the appended claims.

DESCRIPTION OF THE PREFERRED EMBODIMENT

Figure 1:
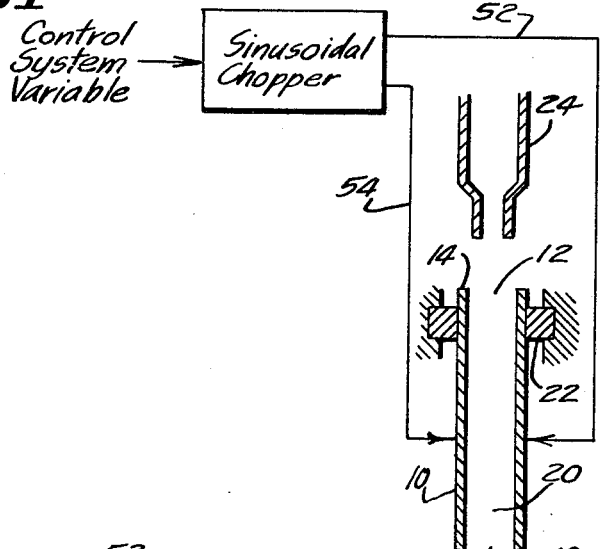
FIGURE 1 is a schematic representation of a fluid-operated sensing circuit constructed in accordance with my invention, portions thereof including my hollow resonant reed arrangement being shown in enlarged diagrammatic view to present details of the elements thereof.

Referring to FIGURE 1 of the drawing in accordance with my invention, I provide an elongated hollow resonant reed 10 having an inlet opening 12 at the stationary end 14 thereof and an outlet or discharge opening 16 at the free end 18 thereof for the passage of fluid through a central passage indicated at 20. The stationary end 14 of the reed 10 is supported in a fixed support indicated at 22.

To pass fluid through the reed passage 20 any suitable means may be used. For example, a jet nozzle indicated at 24 may be positioned in alignment with the reed inlet opening 12 as shown and connected to a source of substantially constant fluid pressure (not shown) for passing a substantially constant flow of fluid through the reed passage 20. It is to be understood that fluid can be forced through the reed either by directly connecting a tube (not shown) to the reed or by using a jet as shown in FIGURE 1.

As shown schematically in FIGURE 1, I provide a conventional fluid amplifier device 26 having control fluid ports 28 and 30 connected respectively to input lines 32 and 34, discharge ports 36 and 38 connected respectively to discharge lines 40 and 42 and a power fluid inlet 45 arranged for connection to a source of fluid under pressure (not shown). As is well known in the art, the differential pressure, $\Delta P_o$, across the outlet ports is controlled by the relative values of control pressure applied to the control ports 28 and 30. Thus, if control line 34 is connected to a source (not shown) of substantially constant fluid pressure and line 32 is connected to receive a fluid signal representative of a variable to be monitored, the value of $\Delta P_o$ will indicate variation of the fluid pressure signal on line 32.

To vary the control pressure in line 32 in relation to the conditions of resonance or non-resonance of reed 10, I provide a hollow receiver 44 having a discharge end 46 connected to line 32 and an inlet end 48 having an opening 50 aligned with the discharge opening 16 of the reed 10. In this arrangement when the reed 10 is in a state of nonresonance, all of the fluid passing through the reed is passed to the fluid amplifier control port 28. On the other hand, when the reed is at resonance frequency a part of the reed fluid flow bypasses the receiver 44 and a smaller fluid flow is received by the fluid amplifier control port 28.

Figure 2:
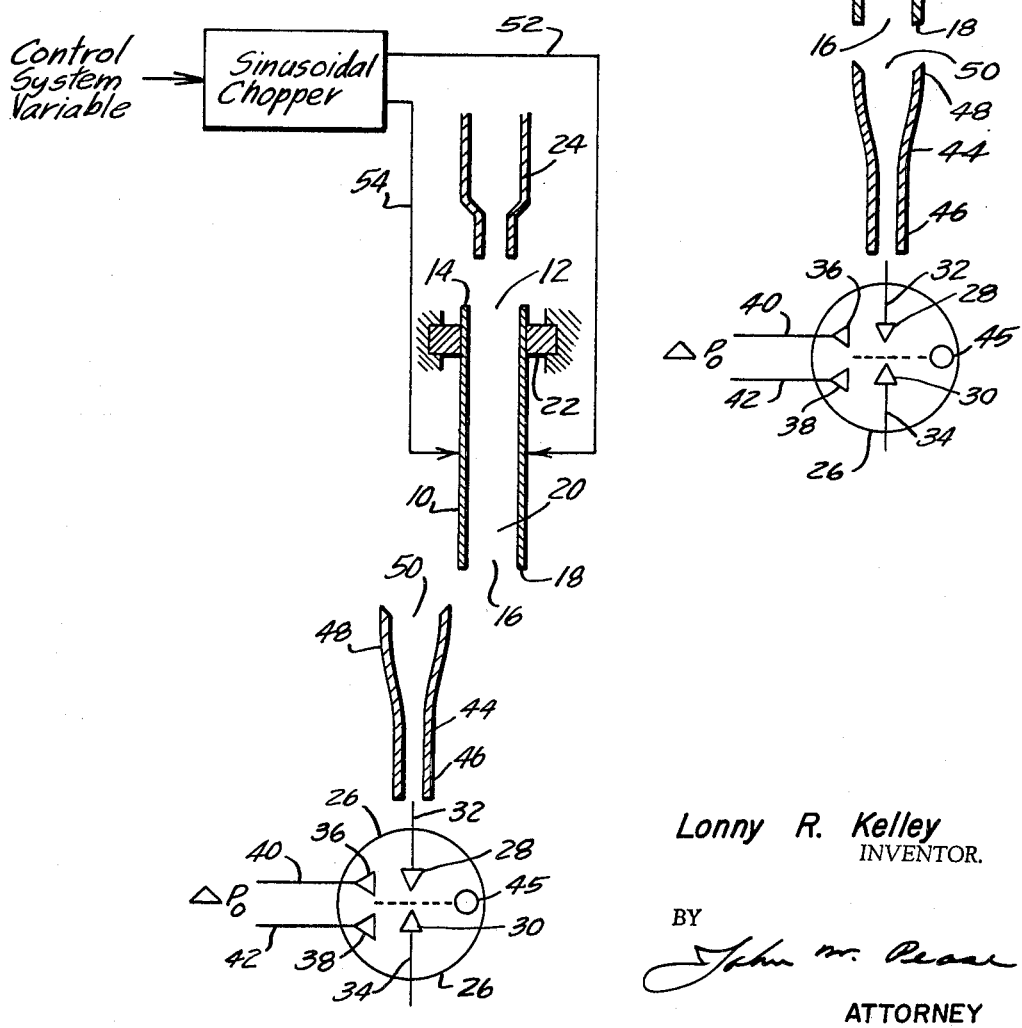
FIGURE 2 is a view partially schematic and partially diagrammatic as in FIGURE 1 of the same elements in a modified arrangement incorporating my invention.

Sensor drive means for the reed 10 may take any suitable form. For example if the reed 10 were mounted directly upon a rotating device (not shown) subject to vibration, the reed would be driven to resonant frequency when the vibrations of the device being monitored achieved vibration of that resonant frequency. In another application as shown in FIGURE 1, the sensor means is a fluid-mechanical device designated sinusoidal chopper for generating a pair of 180° phase displaced pressurized fluid signals having a frequency directly proportional to the monitored value of a control system variable. Such a system, shown schematically in FIGURES 1 and 2, is fully described in U.S. Patent 3,260,456. In this sensing system fluid signals of 180° phase displacement are passed through respective lines 52 and 54 to opposite sides of the reed 10 to vibrate the reed when resonant frequency is attained in the sensing circuit.

In a modification of the subject invention, as shown in FIGURE 2, the outlet 16 of reed 10 and the inlet 50 of receiver 44 are positioned in spaced nonaligned relation. In this arrangement all of the reed fluid flow bypasses the receiver 48 when the reed 10 is in nonresonant condition and a part of the reed fluid flow is directed to the receiver 48 when the reed 10 is in resonance. As is evident the percentage of fluid transferred to the receiver 48 can be varied by variance of the degree of offsetting the reed with respect to the receiver.

Thus, in accordance with the subject invention a considerable degree of flexibility is provided in relation to control of the passage of fluid flow to the control port of a fluid amplifier in response to condition of reed resonance while at the same time affording a simple form of reed readily adaptable to low cost production methods. Further advantage is attained in avoiding variables introduced in conventional reed fluid flow control requiring the interposition of fluid interrupting means.

It will be understood that various changes in the details, materials, and arrangements of parts, which have been herein described and illustrated in order to explain the nature of the invention, may be made by those skilled in the art within the principle and scope of the invention as expressed in the appended claims.

What is claimed is:

1. In a fluid operating sensing circuit of the type including sensor means operatively connected to apparatus to monitor the value of a control variable and provide an output force indicative of said value and a fluid amplifier device having a control pressure inlet to receive a fluid signal for control of its differential output pressure in response to said fluid signal, the improvement comprising:
   (a) a reference resonance frequency reed operatively connected for drive from said sensor means,
   (b) said reed being of elongated hollow construction to provide a central passage from an inlet end to an outlet end thereof,
   (c) fluid supply means having a delivery port aligned with said reed inlet to pass a substantially constant flow of fluid through said reed,
   (d) a fluid receiver arranged in selected fixed position for passing fluid to said control pressure inlet of said amplifier device,
   (e) means supporting said inlet end of said reed in fixed position while allowing said outlet end of said reed to be vibrated in response to drive from said sensor means,
   (f) said fluid receiver having an inlet end selectively dimensioned and arranged in a spaced selective aligned or nonaligned relation to said reed outlet end to pass to said amplifier device from said reed a fluid flow dependent upon the resonant or nonresonant condition of drive of said reed and dependent upon the degree of aligned relation of said reed outlet end and fluid receiver.

2. A sensing circuit according to claim 1,
   (a) said reed being of hollow cylindrical shape.

3. A sensing circuit according to claim 1,
   (a) said fluid receiver inlet end being aligned with said reed outlet to pass to said amplifier device all of said fluid flow when said reed is in nonresonance and only a portion of said fluid flow when said reed is in resonance.

4. A sensing circuit according to claim 3,
   (a) said reed being of hollow cylindrical shape.

5. A sensing circuit according to claim 1,
   (a) said fluid receiver inlet end being sufficiently offset from said reed outlet to pass to said amplifier device a portion of said reed fluid flow when said reed is in resonant condition and not any of said fluid flow when said reed is in nonresonant condition.

6. A sensing circuit according to claim 5,
   (a) said reed being of hollow cylindrical shape.

References Cited

UNITED STATES PATENTS

| | | | |
|---|---|---|---|
| 3,233,522 | 2/1966 | Stern | 137—81.5 |
| 3,260,456 | 7/1966 | Boothe | 137—81.5 XR |
| 3,275,015 | 9/1966 | Meier | 137—81.5 |
| 3,379,204 | 4/1968 | Kelley et al. | 137—81.5 |
| 3,390,692 | 7/1968 | Hastie et al. | 137—81.5 |
| 3,399,688 | 9/1968 | Westerman | 137—81.5 |

SAMUEL SCOTT, Primary Examiner